(12) United States Patent
Inniss et al.

(10) Patent No.: US 6,445,571 B1
(45) Date of Patent: Sep. 3, 2002

(54) COMBINED DC/DATA BUS FOR ELECTRICAL EQUIPMENT

(75) Inventors: Brian Inniss, Dollard des Ormeaux; Michael Hutchins, Beaconsfield, both of (CA)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/585,657

(22) Filed: Jun. 1, 2000

(51) Int. Cl.[7] .............................................. H01R 23/70
(52) U.S. Cl. ...................... 361/624; 174/68.2; 361/825; 439/210
(58) Field of Search ................................ 439/110, 116, 439/210, 211, 212; 307/147–149, 151; 363/141–144, 146; 174/68.2, 70 B, 71 B, 72 B, 88 B, 99 B, 129 B, 133 B, 100; 361/611, 614, 622, 624, 637, 641, 648, 650, 724, 727, 784, 785, 790, 775, 823–827; 191/22 DM, 29 DM, 33 PM

(56) References Cited

U.S. PATENT DOCUMENTS

| | | | |
|---|---|---|---|
| 2,969,421 A | * | 1/1961 | Scott |
| 3,170,092 A | * | 2/1965 | Adams |
| 4,440,970 A | * | 4/1984 | Dale ......................... 174/14 R |
| 4,719,541 A | * | 1/1988 | Ono |
| 5,068,491 A | * | 11/1991 | Ogata et al. ............... 174/16.2 |
| 5,224,918 A | | 7/1993 | Neumann |
| 5,297,015 A | | 3/1994 | Miyazaki et al. ........... 363/146 |
| 5,365,424 A | | 11/1994 | Deam et al. ................. 363/144 |
| 5,394,296 A | | 2/1995 | Erickson, Jr. et al. ...... 361/659 |
| 5,421,751 A | | 6/1995 | Bennett et al. ............. 439/843 |
| 5,422,440 A | | 6/1995 | Palma ..................... 174/133 B |
| 5,745,338 A | | 4/1998 | Bartolo et al. ............. 361/637 |
| 5,764,502 A | | 6/1998 | Morgan et al. ............... 363/65 |
| 5,821,876 A | | 10/1998 | Farrington et al. |
| 5,901,057 A | | 5/1999 | Brand et al. ................. 363/144 |
| 5,933,343 A | | 8/1999 | Lu et al. ..................... 363/144 |
| 5,967,818 A | * | 10/1999 | Carron |
| 5,969,938 A | | 10/1999 | Byrne et al. ................. 361/678 |
| 5,969,965 A | | 10/1999 | Byrne et al. ................. 363/144 |
| 6,016,252 A | | 1/2000 | Pignolet et al. ............. 361/724 |
| 6,068,515 A | * | 5/2000 | Embo |
| 6,157,534 A | * | 12/2000 | Gallagher |
| 6,164,988 A | * | 12/2000 | Wagener |
| 6,201,722 B1 | * | 3/2001 | Hutchins ..................... 363/144 |

FOREIGN PATENT DOCUMENTS

DE      26 13 067      10/1977

* cited by examiner

*Primary Examiner*—Gerald Tolin
(74) *Attorney, Agent, or Firm*—Coudert Brothers LLP

(57) ABSTRACT

A combination DC/data bus assembly for power converter equipment racks includes a pair of side-by-side vertical DC bus bars forming a slot between them. Extruded insulating strips carrying data bus bars are mounted in the DC bus bars so that the data bus bars face each other across the slot. Channels are formed in the front faces of the DC bus bars. A connector mounted on the power converter chassis has male DC contacts that engage the channels, and a male data contact assembly that slides into the slot to make contact with the data bus bars.

14 Claims, 3 Drawing Sheets

COMBINED DC/DATA BUS FOR ELECTRICAL EQUIPMENT

FIELD OF THE INVENTION

This invention relates to bus structures for racks supporting stacked electrical equipment such as power converters, and more specifically to a plug-in bus structure for carrying high-current DC either applied to an output from the electrical equipment as well as data for controlling the equipment.

BACKGROUND OF THE INVENTION

Power supplies for providing DC power to large electronic installations such as mainframe computers conventionally consist of a number of individual power converters that are stacked one above the other on separate chassis in racks that may be enclosed in equipment cabinets. It is desirable for these racks to contain AC power lines and data and DC buses to which a converter may be connected merely by pushing its chassis into the rack. Because the converters used in a given installation would normally have the same shape and size horizontally but could be of varying heights, it is necessary for a bus system built into the rack to allow a converter to be plugged into it at substantially any vertical level. Prior art power system equipment bays have required that the location of each piece of plug-in equipment be predefined usually at the time of initial configuration of the system. Each piece of equipment must also be interconnected and traditionally this is done with a "power shelf" for the converter equipment, in which each power shelf supports three or four converters and a series of cables are used to interconnect multiple power shelves to a common distribution panel. Individual equipment not supported by power shelves must be interconnected using discrete cable assemblies.

Because of space and cost considerations, it is desirable to integrate the data bus with the DC bus, yet assure a reliable contact between the converter and the buses while preventing any possibility of short-circuiting the electronic circuitry during insertion or removal of an individual converter.

SUMMARY OF THE INVENTION

The bus structure of the present invention fulfills the requirements set out above by providing a pair of parallel, vertically extending DC bus bars that define between them a vertically extending slot. Along the sides of the slot, insulating strips are inserted into the DC bus bars. These strips carry the data bus bars on their outer faces. The converter chassis supports a long data connector which fits into the slot and carries the data contacts, and a pair of shorter male DC connectors each of which plugs into a corresponding vertical female contact groove in the front face of each of the DC bus bars. The data contacts are encased in an insulating shroud in the data connector that prevents them from coming into contact with the DC bus bars during insertion or removal of the converter chassis. Also, the mutual spacing of the data contacts and data bus bars is such that the data contacts cannot accidentally bridge two data bus bars.

DESCRIPTION OF THE PREFERRED EMBODIMENT

Figures 1A, 1B:
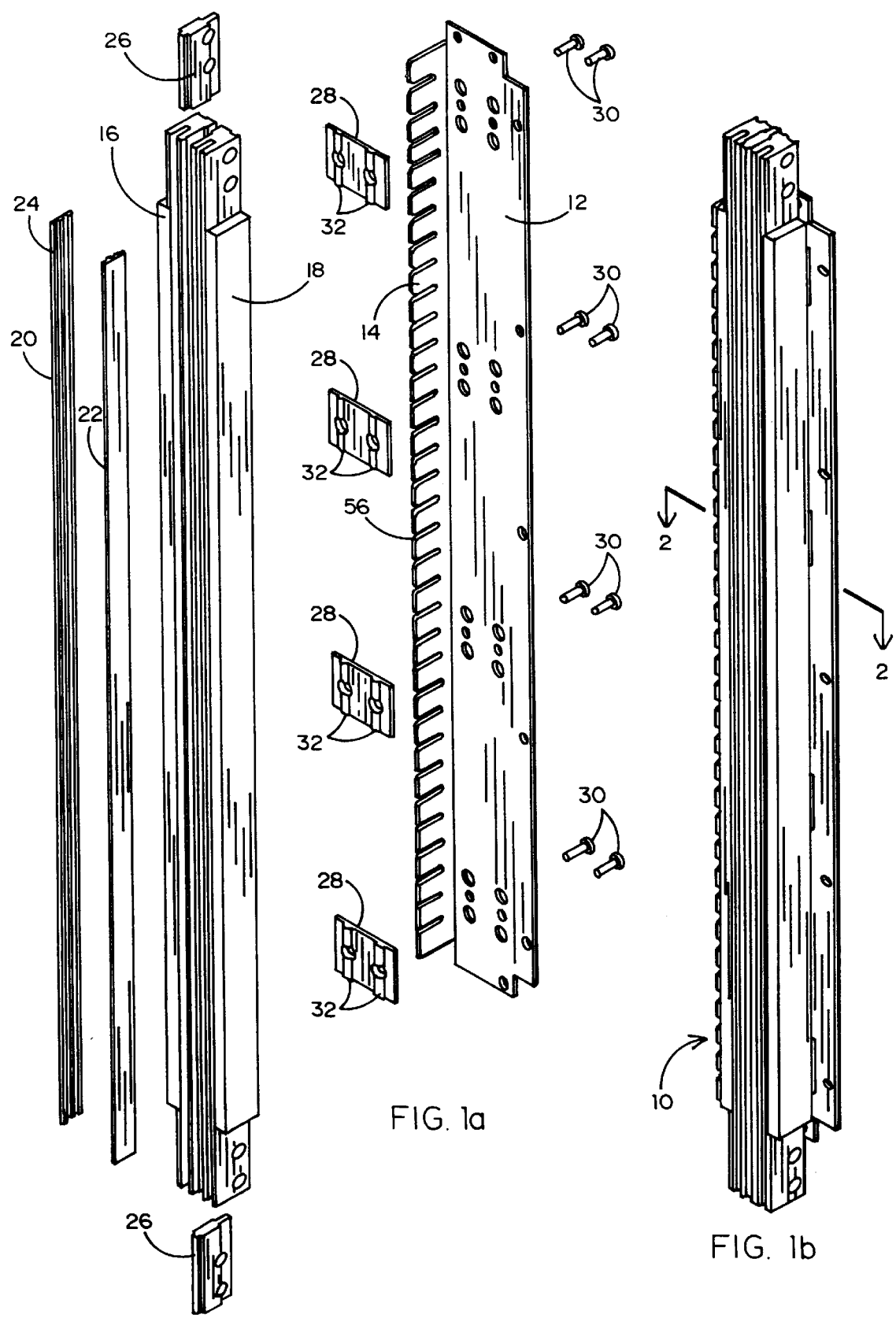
FIG. 1a is an exploded perspective view of the DC/data bus assembly according to the present invention.
FIG. 1b is an assembled perspective view of the FIG. 1 device.

FIGS. 1a and 1b show an overall view of the inventive bus assembly 10. The assembly 10 may advantageously be mounted in a vertical position in a corner, such as the right rear corner, of an equipment rack (not shown). The assembly 10 is mounted to the rack by an L-shaped mounting bracket 12. The flange 14 of the mounting bracket 12 is notched to form a comb for a purpose described below. A pair of bus bars 16, 18 form the two conductors of the DC bus, and the data carriers 20, 22 each carry a plurality of flat copper conductors or tracks 24 to provide the data bus. Nonconductive inserts 26 at the top and bottom of the DC bus prevent the data carriers 20, 22 from slipping out of the DC bus, as will become more apparent from the discussion of FIG. 2 below. The DC bus bars 16, 18 are mounted on the mounting bracket 12 by insulating spacer plates 28 and nonconductive screws 30. Spacer plates 28 are preferably made of molded plastic. A polyester powder coating is preferably used to insulate the exposed sections of bus bars 16, 18.

Figure 2:
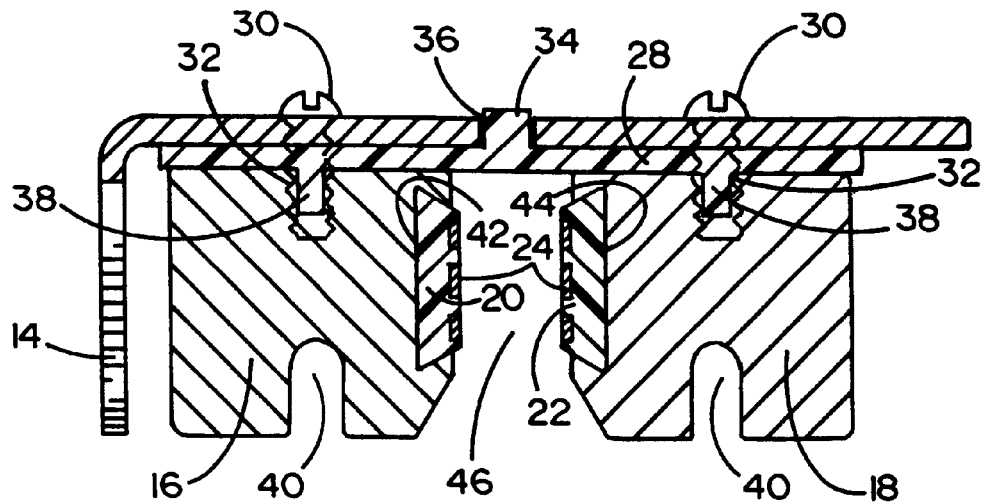
FIG. 2 is a horizontal section along line 2—2 of FIG. 1b.

FIG. 2 shows the structure of the bus assembly 10 in more detail. The spacer plate 28 lies against the bracket 12 with its vertical ridges 32 facing outward. If desired, the plate 28 may be conveniently located with respect to bracket 12 by a locator pin 34 which may engage an opening 36 formed in the bracket 12. The DC bus bars 16, 18 are held against the plate 28, and the plate 28 is simultaneously held against the bracket 12, by the nonconductive screws 30, which may be made of nylon.

The bus bars 16, 18 may typically be copper extrusions to maintain dimensional precision. On their rear side, they are preferably provided with vertically extending grooves 38 which engage the ridges 32 in each spacer plate 28 and assist in holding the bus bars 16, 18 against lateral movement. A female contact channel 40 extends on the front face of each bus bar 16, 18 throughout their length.

On their sides facing each other, the bars 16, 18 have formed therein vertically extending recesses 42, 44 which slidingly receive the data carriers 20, 22, respectively. The data carriers 20, 22 are extruded strips of nonconductive material. They are sufficiently thick to not only provide mechanical support to the data bus bars 24, but also to space the data bus bars 24 sufficiently from the DC bus bars 16, 18 to avoid electrical interference.

The recesses 42, 44 are undercut so as to hold the data carriers 20, 22 firmly against lateral movement. The data carriers 20, 22 are so dimensioned that their inner faces protrude into the slot 46. Those inner faces carry the data bus bars 24. The data bus bars 24 may advantageously take the form of gold plated copper strips secured to the data carriers 20, 22. It is also preferable that the copper strips be underplated with nickel. This structure is compatible with the low voltage, low current properties of the data signals on the data bus bars 24. In a preferred embodiment, three of the data bus bars 24 comprise a serial data bus, and as such, its characteristic impedance must be controlled to be compatible with the transmission protocol and drivers associated therewith. Due to the conductive nature of the walls of the bus bars 16, 18, it is necessary that the data carriers 20, 22 also be dimensioned to provide a low dielectric spacer between the serial bus tracks 24 and the bus bars 16, 18 in order to keep the capacitance low and the transmission line characteristic impedance ($Z_0$) high. Data carriers 20, 22 provide these requirements while maintaining precise distance between respective data bus bars 24 and respective walls of bus bars 16, 18 as well as a precise spacing between adjacent data bus bars 24.

Figure 3:
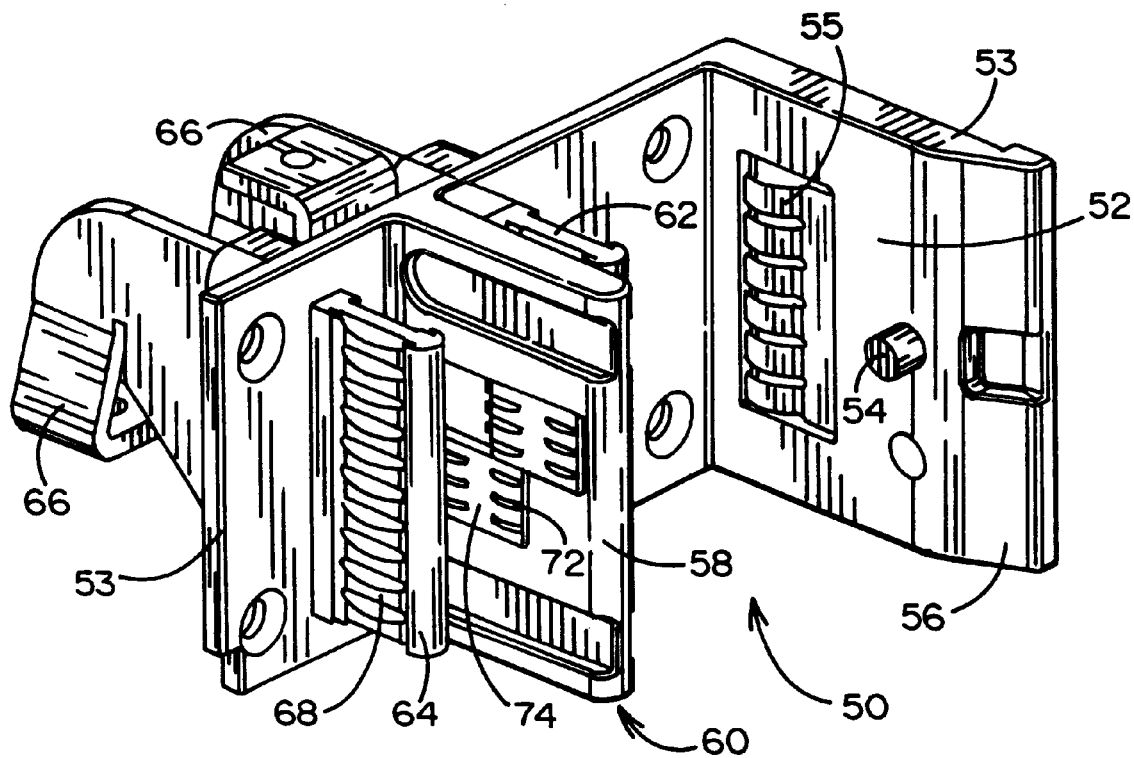
FIG. 3 is a perspective view of the DC and data contacts mounted on the chassis of a converter.

FIG. 3 shows the connector 50 mounted on the chassis of a power converter or other piece of electrical equipment (not shown) that interacts with the assembly 10 of FIGS. 1a–2 to form a plug-in interconnection between the power converter and the bus assembly 10. A guide key is formed on connector 50 to mate with a corresponding structure on assembly 10. Specifically, when the power converter is pushed into place in the rack, the surface 52 of an end plate 53 of connector 50 is caused to lie against the outside of the flange 14. In that position, a pin 54 formed in the plate 53 acts as a guide key to engage one of the notches 56 (FIG. 1a) of the flange 14 to hold the power converter chassis against vertical movement. Surface 52 is beveled at the end of plate 53, as shown at 56, to initially assist in guiding connector 50 into mating contact with assembly 10. Also, in that position, the resilient wipers 55 attached to the connector 50 make contact with the flange 14 to electrically ground the power converter chassis to the rack.

As the connector 50 and the chassis to which it is attached are pushed rearwardly against the bus assembly 10, the insulating sheath 58 of the data connector 60 first enters the slot 46 and aligns the connector 50 in conjunction with surface 52 so that its male DC contacts 62, 64 will accurately enter the female contact channels 40 of the DC bus bars 16, 18 respectively. The DC contacts 62, 64 are connected to the DC output of the converter inside the chassis by appropriate insulated connection plates 66. The contacts 62, 64 are equipped with resilient wipers 68 to assure a good contact with the bus bars 16, 18.

Figure 4:
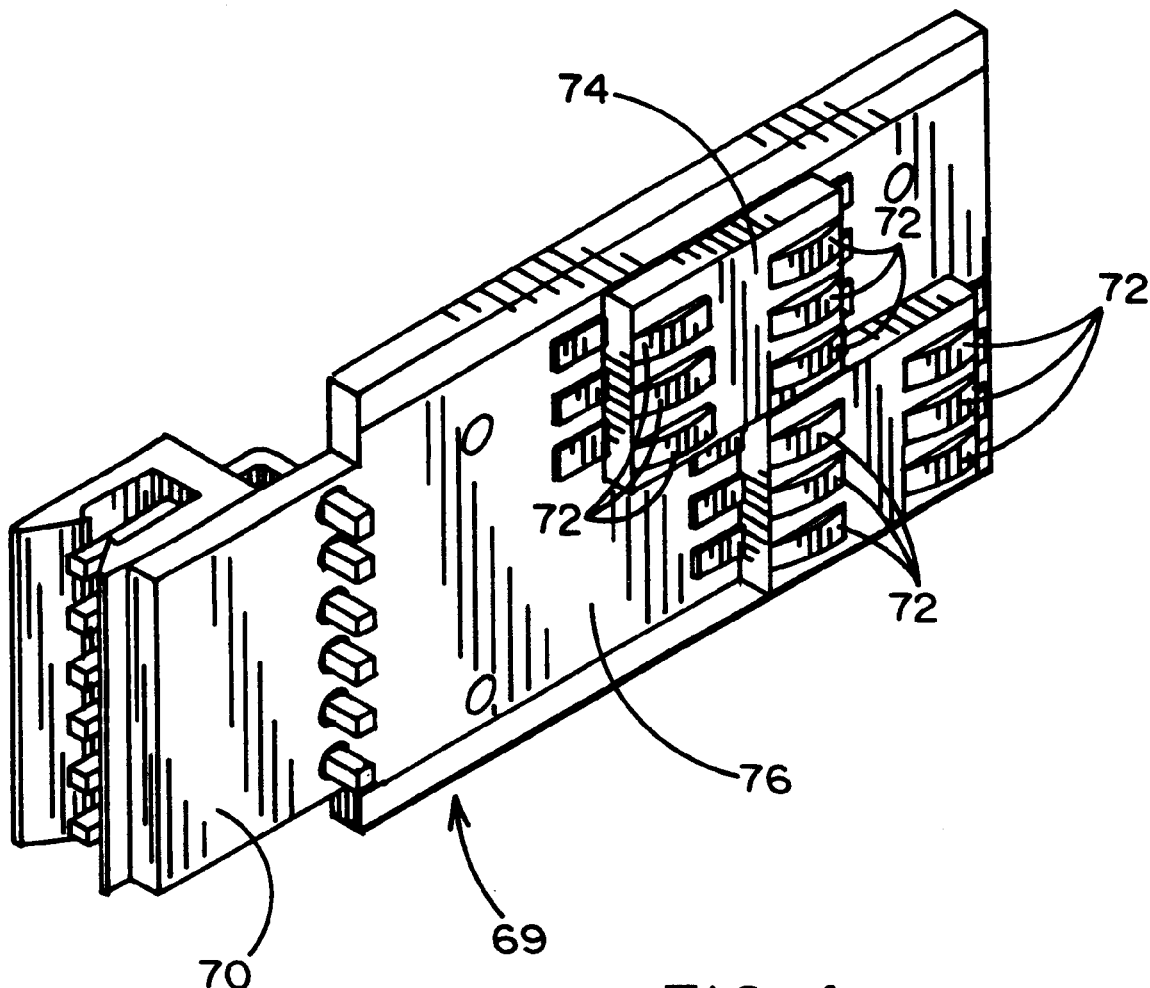
FIG. 4 is a perspective view of the data contact assembly.

The insulating sheath 58 of the data connector 60 encloses a data contact assembly 69 shown in FIG. 4 and described in more detail in copending application Ser. No. 09/586,679, filed Jun.1, 2000 and entitled "CONNECTOR FOR COMBINED DC/DATA BUS" (now issued as U.S. Pat.No. 6,315, 589.) As seen in FIG. 4, data contact assembly 69 includes an interface connector 70 connected to a printed circuit board 76. Interface connector 70 protrudes into the interior of the power converter chassis for connection to its circuitry (not shown). The interface connector 70 is electrically connected as appropriate to the wipers 72 of contact pads 74. These contact pads 74 and wipers 72 are located on each side of printed circuit board 76 to enable contact with respective data bus bars 24 positioned on opposite sides of slot 46. Printed circuit board 76 of contact assembly 69 is mounted, as best shown in FIG. 3, in the sheath 58. As the data connector 60 is inserted into the slot 46, the wipers 72 come into wiping contact with the data bus bars 24. The spacing of the wipers 72 and of the data bus bars 24 is such that the wipers 72 cannot contact more than one data bus bar at any time during the insertion of the connector 50 into, or its withdrawal from, the bus assembly 10.

Although preferred and alternative embodiments of the present invention and modifications thereof have been described in detail herein, it is to be understood that this invention is not limited to those precise embodiments and modifications, and that other modifications and variations may be created by one of ordinary skill in the art without departing from the spirit and scope of the invention as defined in the appended claims.

What is claimed is:

1. A combination DC and data bus assembly for stacked electrical equipment having built-in connectors, comprising:
   a) a pair of elongated DC bus bars disposed vertically adjacent said equipment stack and positioned to engage said connectors as said equipment is placed into operating position in said stack;
   b) a plurality of vertically extending data bus bars carried by said DC bus bars in insulated relationship thereto;
   c) each of said DC bus bars having a substantially continuous channel means formed in its front face, said channel means for receiving an electrical connector therein.

2. The assembly of claim 1, in which said data bus bars are substantially longitudinally coxtensive with said DC bus bars.

3. The assembly of claim 2, in which said data bus bars are carried by an insulated strip engaged by said DC bus bar side face, said side face being undercut, and said strip engaging said undercut to prevent horizontal movement of said strip.

4. The assembly of claim 3, in which said DC bus bars and said strip are extrusions.

5. A combination DC and data bus assembly for stacked electrical equipment having built-in connectors, comprising:
   a) a pair of elongated DC bus bars disposed vertically adjacent said equipment stack and positioned to engage said connectors as said equipment is placed into operating position in said stack; and
   b) a plurality of vertically extending data bus bars carried by said DC bus bars in insulated relationship thereto;
   c) said data bus bars being substantially longitudinally coextensive with said DC bus bars;
   d) said data bus bars being carried by an insulated strip engaged by a side face of said DC bus bars, said face being undercut, and said strip engaging said undercut to prevent horizontal movement of said strip; and
   e) said data bus bars being formed of conductive tape attached to said strip.

6. A combination DC and data bus assembly for stacked electrical equipment having built-in connectors, comprising:
   a) a pair of elongated DC bus bars disposed vertically adjacent said equipment stack and positioned to engage said connectors as said equipment is placed into operating position in said stack; and
   b) a plurality of vertically extending data bus bars carried by said DC bus bars in insulated relationship thereto;
   c) each of said DC bus bars having a substantially continuous channel formed in its front face, said channel being adapted to receive a connector therein; and
   d) said assembly further comprising a mounting bracket on which said DC bus bars are non-conductively mounted, said mounting bracket including a flange having a plurality of notches positioned along the length of said flange to guide a connector having a pair of male DC contacts into mating relationship with respective said bus bar channels.

7. A combination of DC and data bus assembly for stacked electrical equipment having built-in connectors, comprising:
   a) a pair of elongated DC bus bars disposed vertically adjacent said equipment stack and positioned to engage said connectors as said equipment is placed into operating position in said stack;
   b) said DC bus bars each having a front face, a rear face, and a side face facing a side face of the other of said DC bus bars, said side faces defining a slot between them; and c) a plurality of vertically extending data bus bars insulated from said DC bus bars and positioned on said side faces in said slot.

8. The assembly of claim 7, in which each of said DC bus bars has a substantially continuous channel formed in said front face, said channel being adapted to receive a connector therein.

9. A connector system for connecting electrical equipment having a chassis to a combination DC and data bus when said equipment is horizontally placed into operating position in an equipment stack, comprising:

a) a connector mounted on said chassis, said connector having a pair of horizontally spaced male DC contacts and a multiple male data contact assembly;

b) a pair of elongated DC bus bars disposed vertically adjacent said equipment stack and positioned to engage said connectors as said equipment is placed into operating position in said stack;

c) said DC bus bars each having a front face, a rear face, and a side face facing a side face of the other of said DC bus bars, said side faces defining a slot between them;

d) a plurality of vertically extending data bus bars insulated from said DC bus bars and positioned on said side faces in said slot;

e) each of said DC bus bars having a substantially continuous channel formed in said front face; and f) said male DC contacts engaging said channels and said data contact assembly engaging said slot to thereby connect such data contact assembly to said data bus bars.

10. The system of claim 9, in which said data contact assembly includes a plurality of data contacts mutually arranged such that none of them can bridge adjacent said data bus bars while said data contact assembly is engaging said slot.

11. The assembly of claim 9 further comprising a mounting bracket on which said DC bus bars are non-conductively mounted, said mounting bracket including a flange have a plurality of notches positioned along the length of said flange to guide a connector having a pair of male dc contacts into a mating relationship with respective said bus bar channels.

12. The system of claim 11 and wherein said connector includes a guide key for mating with one of said notches and a beveled surface for initially guiding said connector into mating contact with said DC bus bars.

13. The system of claim 12 further comprising a plurality of resilient wipers formed on said connector for mating with the surface of said flange to provide an electrical ground between said chassis and said equipment stack.

14. The system of claim 9 wherein each said male DC contact includes a plurality of resilient wipers for contacting a respective said DC bus bar.

* * * * *